United States Patent [19]

McLaughlin

[11] Patent Number: 5,605,596
[45] Date of Patent: Feb. 25, 1997

[54] DUAL GUMSTRIP APPLICATOR FOR TIRE CORD BELTS

[75] Inventor: James L. McLaughlin, Akron, Ohio

[73] Assignee: The Goodyear Tire & Rubber Company, Akron, Ohio

[21] Appl. No.: 384,053

[22] Filed: Feb. 6, 1995

[51] Int. Cl.⁶ .................................................. B32B 31/08
[52] U.S. Cl. .......................... 156/395; 156/202; 156/216; 156/406.4; 156/463; 156/467; 156/540; 156/554
[58] Field of Search .................................. 156/201, 202, 156/130, 216, 238, 247, 463, 467, 540, 554, 406.4, 395; 226/190, 195, 196, 197, 192

[56] References Cited

U.S. PATENT DOCUMENTS

| | | | |
|---|---|---|---|
| 1,590,371 | 6/1926 | Haren | 156/202 |
| 1,732,776 | 10/1929 | Shively. | |
| 1,747,856 | 2/1930 | Burkley et al. . | |
| 1,827,674 | 10/1931 | Shively. | |
| 1,924,083 | 8/1933 | Carter et al. | 154/4 |
| 2,095,733 | 10/1937 | Coryell | 226/190 |
| 2,854,235 | 9/1958 | Mursch | 226/192 |
| 2,952,201 | 9/1960 | Gibson | 226/190 |
| 3,044,534 | 7/1962 | Yoho | 156/467 |
| 3,252,846 | 5/1966 | Huber et al. | 156/201 |
| 3,291,674 | 12/1966 | Worrall et al. | 156/353 |
| 3,393,849 | 7/1968 | Hass | 226/196 |
| 3,450,590 | 6/1969 | Mers | 156/540 |
| 3,580,791 | 5/1971 | Jordan | 156/540 |
| 3,897,943 | 8/1975 | Head et al. | 270/86 |
| 3,917,502 | 11/1975 | Shirasaka et al. | 156/353 |
| 4,401,503 | 8/1983 | Hertel | 156/216 |
| 4,588,463 | 5/1986 | Barber et al. | 156/216 |
| 4,750,966 | 6/1988 | Koller | 156/216 |
| 4,909,880 | 3/1990 | Kittelson et al. | 156/425 |
| 4,913,328 | 4/1990 | Schulz | 226/190 |
| 5,004,516 | 4/1991 | Koga et al. | 156/463 |
| 5,133,821 | 7/1992 | Jensen | 156/247 |

Primary Examiner—Geoffrey L. Knable
Attorney, Agent, or Firm—Harlan E. Hummer

[57] ABSTRACT

A method and apparatus is described for applying unvulcanized gumstrips in precise overlapping relation on the marginal edges of an unvulcanized tire reinforcement belt or breaker to enhance the adhesion between the reinforcement belt or breaker and surrounding components of a finished, vulcanized tire. The method and apparatus comprise a number of important features; namely, tensioning the gumstrips as they pay out from a letoff device, reeving the gumstrips, in tension, at least partially around a pair of barrel-shaped rollers which precisely locate the gumstrips for subsequent contact with a belt as it moves in a horizontal pathway, providing a specially contoured roller for applying the gumstrips to the moving belt, removing a protective cover sheet from each gumstrip at a unique angle where the resistance to separating the two components is minimized, and folding any portions of the gumstrips overhanging the marginal edges of the belt, at a plurality of stations which employ at least two sets of rollers which are resiliently and horizontally preloaded to accommodate variations in the width of the belts being processed.

16 Claims, 2 Drawing Sheets

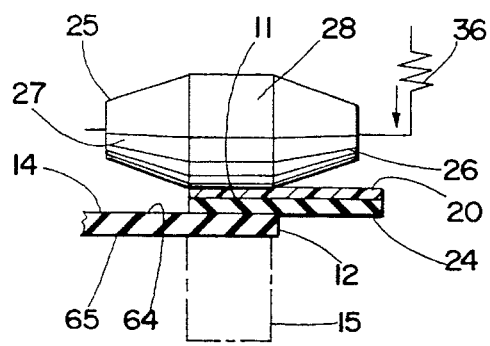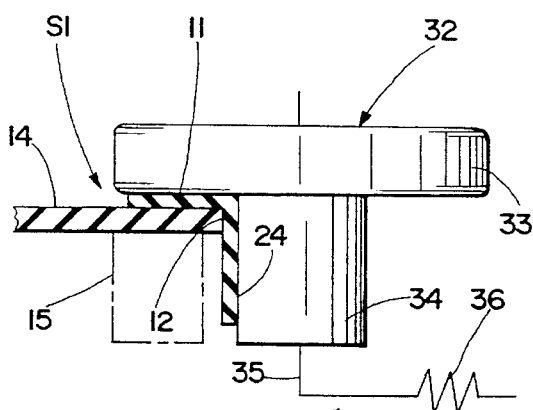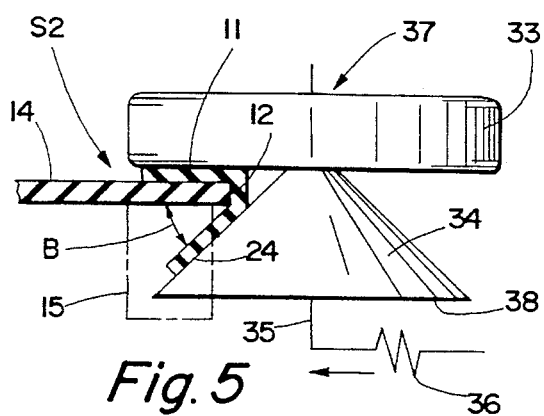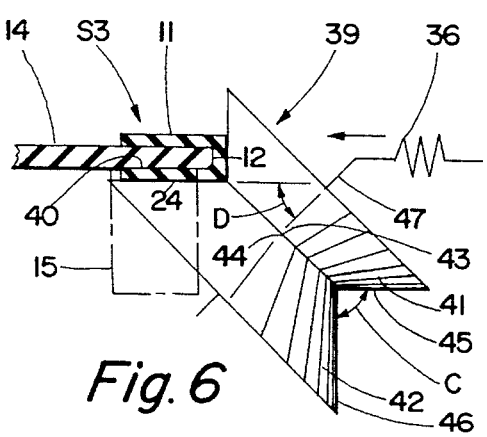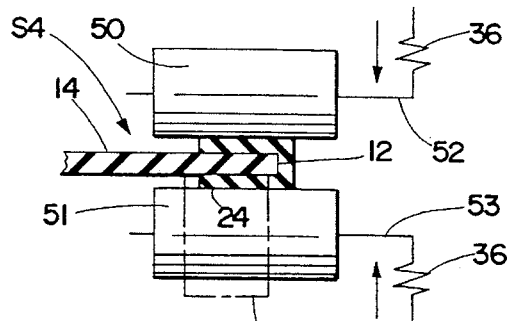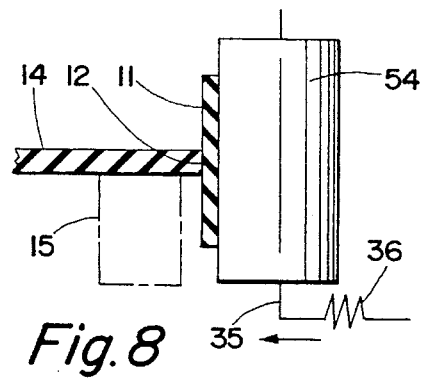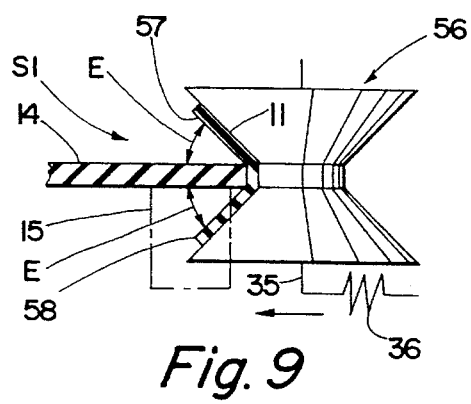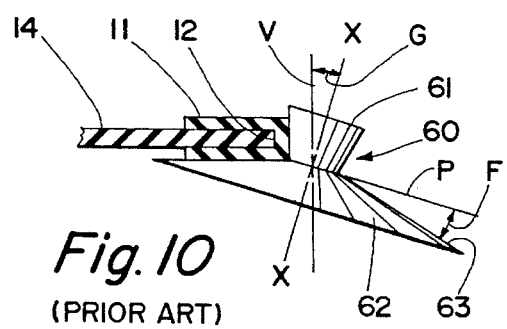

DUAL GUMSTRIP APPLICATOR FOR TIRE CORD BELTS

The invention relates to tires, especially to the machinery which is used to build tires. More particularly, the invention concerns a specific tire building machine which is used to apply strips of a very tacky, unvulcanized gum rubber to the opposing marginal edges of, for example, an unvulcanized tire reinforcement belt or breaker, prior to the use of the belt in the construction of a tire. The gumstrips, as they are known, are designed to enhance the adhesion between the exposed reinforcement tire cord ends at the marginal edges of the belt and the surrounding rubber of a finished, vulcanized tire.

The terms belt and breaker are used synonymously in this application, since both are used to reinforce the crown of a tire, i.e. the tire in the area of the tire tread. The difference between the two is the angle of the reinforcement cords in relation to a plane which bisects the tire and is normal to the center or rotational axis of the tire, the breaker having a substantially higher cord angle than the belt which is better suited for radial type tires.

For convenience in carrying out the above process, a number of shorter, unvulcanized rubber belts with reinforcement cords, are joined together in abutting end-to-end relationship to form one continuous, composite belt for processing, as the composite belt moves along a horizontal pathway. Occasionally, adjacent belts are not perfectly aligned, thereby causing slight lateral offsets in the horizontally moving composite belt which, for convenience, will hereinafter be referred to as a belt which can include a single, long continuous belt instead of a number of shorter belts.

Unvulcanized gumstrips are applied flush with the opposing marginal edges of an unvulcanized belt, or in partially overhanging relation with the marginal edges of such a belt, as the belt travels along the horizontal pathway. In the latter case, the portions of the gumstrips overhanging the marginal edges are folded around the marginal edges to encapsulate the marginal edges in gum rubber. At present, the folding operation is initiated and completed by a single pair of rollers which are fixedly mounted adjacent the marginal edges of the moving belt. Also, in the past, the gumstrips have been brought to the moving belt by means of U-shaped channels which are not the most accurate way of positioning the gumstrips for engagement with the belt, since the gumstrips are capable of riding up onto the upstanding side flanges of the channels, to adversely effect the placement of the gumstrips on the moving belt. Accordingly, the gumstrips have been made wider than necessary to compensate for any lateral misplacement of the gumstrips during the inaccurate positioning of the very tacky gumstrips, prior to contact with the sticky, unvulcanized rubber of the belt.

Moreover, the gumstrips are covered by a liner which, in the past, has been removed, prior to contact of the gumstrips with the moving belt. Thus, the gumstrips are free to stretch or otherwise become distorted during the brief interval of time between removal of the liner and contact with the moving belt. The invention is designed to more precisely position the gumstrips for contact with the moving belt, to eliminate or substantially reduce any distortion of the gumstrips before contact with the moving belt, and to improve the folding of the gumstrips around the marginal edges of the moving belt.

Briefly stated, the invention is in an apparatus and method for more precisely applying an unvulcanized gumstrip in predetermined overlapping relation on at least one marginal edge of a moving, unvulcanized rubber tire reinforcement belt. The apparatus essentially comprises, I) a barrel shaped roller to guide each gumstrip and attached liner into position for engaging the moving belt, II) a special mechanism for removing the liner from the gumstrip shortly after the gumstrip contacts the moving belt, and III) a number of stations, downstream of where the liner is removed from a gumstrip, wherein any portion of a gumstrip overhanging a marginal edge of the moving belt, is incrementally folded around the marginal edge in successive stages to encapsulate the marginal edge in unvulcanized gum rubber. The folding operation is carried out by a series of rollers which are resiliently loaded in the direction of an adjacent marginal edge of the moving belt, to adjust for any variations in the width of the belt.

In another aspect of the invention, a specially contoured roller is provided to press the positioned gumstrip into contact with the moving belt, such that the gumstrip will not part from the belt as the liner is removed from the gumstrip.

The following description of the invention will be better understood by having reference to the accompanying drawing, wherein:

FIG. 3 is a view of one of the applicator rollers for directing the gumstrips into contact with the moving belt, as seen from the line 3—3 of FIG. 1, this and the following views being designed to show the gumstrip application and folding operation at only one of the marginal edges of the belt, since the gumstrips at both marginal edges are treated alike;

FIG. 4 is a view of one of the folding rollers of the gumstrips, as seen from the line 4—4 of FIG. 1;

FIG. 5 is a view of another one of the folding rollers of the gumstrips, as seen from the line 5—5 of FIG. 1;

FIG. 6 is a view of still another one of the folding rollers of the gumstrips, as seen from the line 6—6 of FIG. 1;

FIG. 7 is a view of one of the pairs of stitching rollers for the gumstrips, as seen from the line 7—7 of FIG. 1;

FIG. 8 is a view similar to that of FIG. 3, and is designed to show how the gumstrips can be differently placed on the marginal edges of a moving belt;

FIG. 9 is similar to FIG. 4, and is designed to show different rollers which are used in connection with the gumstrip placement of FIG. 8, to initiate and complete the folding of the gumstrips around the marginal edges of the moving belt; and FIG. 10 is similar to FIG. 4, and is designed to show a prior art folding roller which is fixedly mounted adjacent the marginal edge of a moving belt to fold the gumstrip around the marginal edge in, for example, a single operation.

Figure 1:
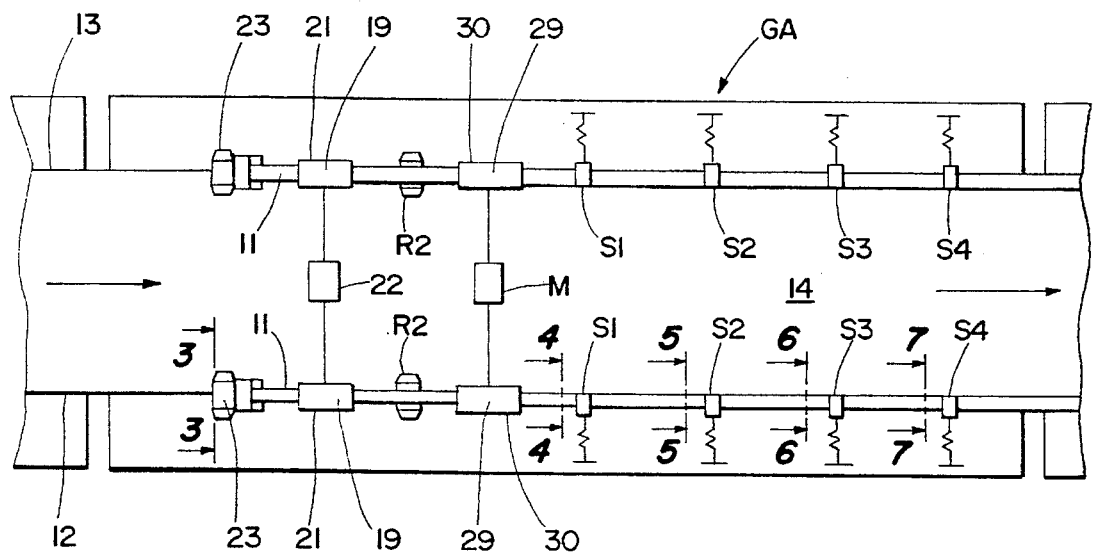
FIG. 1 is a schematic-type plan view of an apparatus which is made in accordance with the invention and designed to apply gumstrips to a moving belt and to encapsulate the exposed reinforcement tire cord ends at the marginal edges of an unvulcanized tire reinforcement belt in strips of unvulcanized gum rubber.
Figure 2:
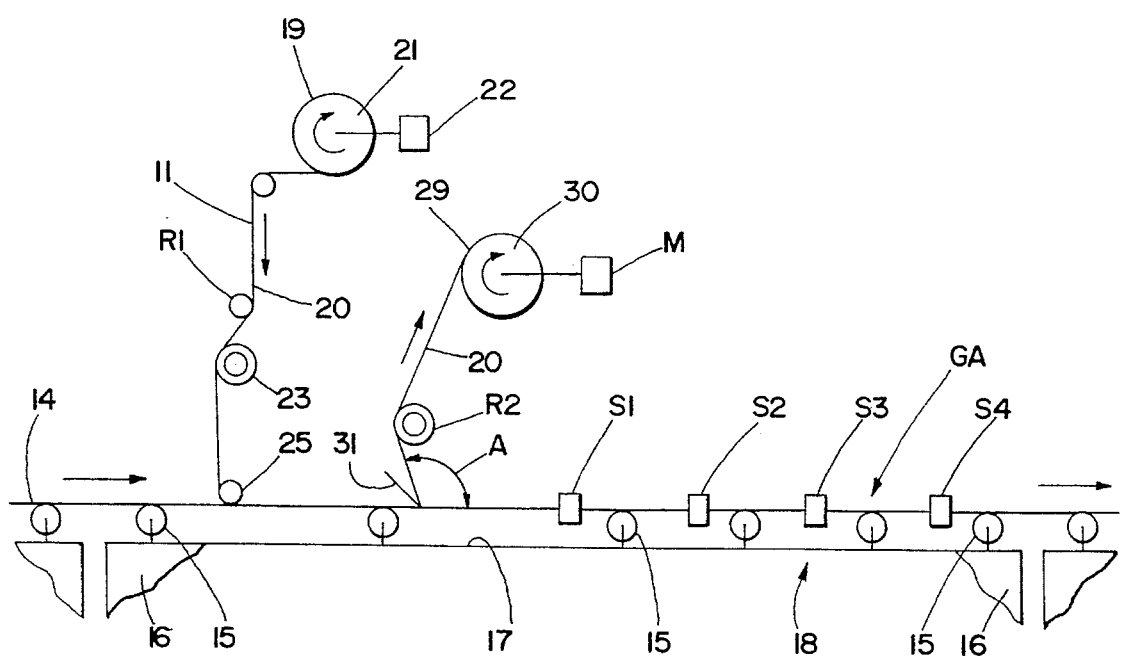
FIG. 2 is a schematic-type side view of the apparatus.

With general reference to the drawing for like parts, and particular reference to FIGS. 1 and 2, there is shown a dual gumstrip applicator or apparatus GA which is designed to automatically apply a pair of relatively thin gage, cordless strips 11 of unvulcanized gum rubber to the marginal edges 12 and 13 of a composite and unvulcanized, cord reinforced belt 14, to enhance adhesion between the belt 14 and adjacent components of a tire in which one or a plurality of such belts are positioned underneath the tread of the tire to reinforce the crown of the tire.

The composite belt 14, for convenience in applying the gumstrips 11, is formed by a number of shorter, similar belts that are joined together in abutting, end-to-end relation. The composite belt 14 is designed to move horizontally through the gumstrip applicator GA in supported relation on a number of strategically located support rollers 15 which are disposed in horizontal planar relation and designed to rotate freely on the framework 16 of a portable table 17 which can be moved into and out of an assembly line, generally indicated at 18, which can include a number of machines used, for example, in the formation of the composite belt 14, in bringing the belt 14 to and from the gumstrip applicator GA, and in using the gumstrip treated belt in the construction of an unvulcanized tire for subsequent molding and vulcanization.

The two gumstrips 11 used in the process, are spirally wound on similar but separate reels 19 and conventionally separated thereon by any suitable liners 20, such as thin sheets of polyethylene. The reels 19 of coiled gumstrips 11 are removably mounted on similar, but separate letoff devices 21 which are carried by the gumstrip applicator GA above the horizontal plane in which the belt 14 moves. The letoff devices 21 are each provided with a braking device 22 which is designed to tension the gumstrips 11, as they pay out from the letoff devices 21.

A pair of similar, laterally adjustable barrel-shaped rollers 23 are disposed between the letoff devices 21 and the horizontally moving belt 14, to laterally position the gumstrips 11 for subsequent contact with the moving belt 14. Such barrel-shaped rollers have been used in the past to guide small conveyers along a desired pathway and to guide unvulcanized rubber laminates in a laminating process. It has been found that the barrel-shaped, guide rollers 23 can precisely position the gumstrips 11 on the marginal edges 12 and 13 of the belt 14, providing the gumstrips 11 move at least partially around the barrel-shaped guide rollers 23 in compressive relation with the guide rollers 23. This is accomplished by the provision of a conventional, cylindrical roller R1 immediately upstream of each barrel-shaped guide roller 23 in horizontally or laterally offset relation, such that the gumstrips 11 are forced to move from the upstream rollers R1 at least partially around the guide rollers 23, and the gumstrips 11, being in tension, compressively engage the guide rollers 23, as they move in a small arcuate pathway around the smooth, outer cylindrical surfaces of the guide rollers 23.

The gumstrips 11 are positioned on the marginal edges 12 and 13 of the belt 14 in one of two ways. Firstly, the gumstrips 11 can be positioned on the belt 14, such that they are flush with the marginal edges 12 and 13, i.e. they do not extend laterally beyond the marginal edges 12 and 13 of the belt 14. Secondly, the gumstrips 11 can be positioned on the belt 14, such that they extend laterally beyond or overhang, the marginal edges 12 and 13 of the belt 14. In the latter case, the gumstrips 11 have been made wider than necessary, in the past, to accommodate lateral variations in the placement of the gumstrips 11 by conventional methods. The barrel-shaped rollers 23 have proven to be so precise in guiding the gumstrips 11 to the belt 14, that the gumstrips 11 can be made narrower, thereby saving vast amounts of material, when you consider the millions of tires being built. No further processing of the gumstrips 11 is required, when they are placed flush with the marginal edges 12 and 13 of the belt 14. Thus, further discussion of the invention will be in relation to the latter case where the gumstrips 11 are positioned on the moving belt 14, such that portions 24 thereof extend laterally beyond and overhang the marginal edges 12 and 13.

The gumstrips 11 and attached liners 20 move from the guide rollers 23 to a pair of similar, applicator rollers 25 which in this case, as best seen in FIG. 3, are specially contoured to ensure that the gumstrips 11 will engage and stick to the marginal edges 12 and 13 of the belt 14, especially during the separation of the liners 20 from the gumstrips 11. The applicator rollers 25 each include a pair of oppositely disposed, truncated cones 26 and 27 which extend from opposing ends of a cylindrical center section 28 which is designed to engage the tacky gumstrips 11 and press them firmly against the marginal edges 12 and 13 of the belt 14.

Just downstream from the applicator rollers 25, relative to the movement of the belt 14 through the gumstrip applicator GA, the liners 20 are removed from the gumstrips 11 to identical reels 29 of similar windup devices 30 which are also carried by the gumstrip applicator GA above the horizontal pathway of the moving belt 14. The windup devices 30 are designed to reel in the separated liners 20, as they become separated from the gumstrips 11. The windup devices 30 are operated, in unison, to simultaneously rotate the reels 29 in synchronized relation with the movement of the belt 14 through the gumstrip applicator GA, by any suitable means, such as the motor M which is associated with each windup device 30.

In the past, the liners 20 have been removed from the gumstrips 11, prior to engagement of the gumstrips 11 with the moving belt 14. During this brief period of freedom from the liners 20, the gumstrips 11 are susceptible to stretching or otherwise becoming distorted. It has been found that the placement of the gumstrips 11 on the moving belt 14 is highly improved when the liners 20 are maintained attached to the gumstrips 11.

A pair of laterally aligned, identical, flat plates 31 are positioned equidistant downstream of the applicator rollers 25 to help strip the liners 20 from the gumstrips 11. The stripping plates 31 act as a line of embarkation of the liners 20 from the gumstrips 11. It has been found that least resistance to separation of the liners 20 from the gumstrips 11 is encountered, when the liners 20 leave the gumstrips 11 at similar obtuse angles A of about 120 degrees in relation to the belt 14 moving horizontally immediately downstream from the stripping plates 31. Accordingly, the stripping plates 31 should be disposed at similarly measured, obtuse angles which are greater than 120 degrees. The stripping of the liners 20 from the gumstrips 11 at the aforementioned angle A of about 120 degrees, is accomplished by the provision of liner engaging rollers R2 which are located above the horizontal pathway of the moving belt 14 in upstream measured relation from the disembarkment or stripping lines that are provided by the flat stripping plates 31. The liner engaging rollers R2 can be barrel-shaped to help guide the removed liners 20 to the take up devices 30, if desired.

The belt 14 with the attached gumstrips 11 moves horizontally downstream from the stripping plates 31 to a first station or stage S1 of the gumstrip folding operation, where the overhanging portions or ends 24 of the gumstrips 11 engage a first pair of identical, preloaded and freely rotatable, generally mushroom-shaped rollers 32 which, as best seen in FIG. 4, are laterally aligned and designed to engage and fold the overhanging ends 24 of the gumstrips 11 downward about 90 degrees from the horizontal pathway of the moving belt 14, to a position where the gumstrips 11 are firmly seated in compressed engagement against the marginal edges 12 and 13 of the belt 14.

The first pair of folding rollers 32 each comprises an upper, cylindrical cap 33 in juxtaposed relation to a separate, smaller diameter, lower cylindrical spool 34 which is mounted with the cap 33 on a common axle 35 which is vertically disposed or normal to the horizontal pathway of the moving belt 14, such that the cap 33 and spool 34 are free to rotate independently of each other at different speeds in horizontal planes. The common axles 35 are preloaded in horizontal directions towards each other and the moving belt 14 by any suitable means, such as hydraulic cylinders or coil springs 36 which are mounted on the gumstrip applicator GA.

The belt 14 and partially folded gumstrips 11 move downstream from the first station to a second station or stage S2 where the downwardly extending portions 24 of the partially folded gumstrips 11 are engaged by a second pair of preloaded, identical folding rollers 37 which, as best seen in FIG. 5, are somewhat similar, in design, to those of the first stage S1, and which reversely fold the portions 24 under the marginal edges 12 and 13 of the belt 14 in directions towards each other such that the included angle B between each folded portion 24 and the horizontal pathway of the moving belt 14 is substantially less than 90 degrees, e.g. 45 degrees.

The second pair of folding rollers 37 are identical to the first pair of folding rollers 32, except for the lower spool 34 which is not cylindrical, but in the form of a truncated cone which has a larger diameter base 38 which is farthest spaced from the separate, upper cap 33. The second folding stage S2 ensures that the marginal edges 12 and 13 of the belt are sealed from the ambient atmosphere and that no air pockets are formed at such edges. The separate rollers 33 and 34 of the second pair of folding rollers 37 are, like those of the first pair of rollers 32, separately mounted for independent rotation on a common axle 35 which is horizontally preloaded by any suitable means 36, as previously described.

The belt 14 and reversely folded gumstrips 11 move downstream from the second stage S2 to a third station or stage S3, where the folding operation is completed by a third pair of identical, preloaded folding rollers 39 which completes the reverse folding of the portions 24 into compressive engagement with the adjacent undersides 40 of the marginal edges 12 and 13 of the belt 14.

The third pair of folding rollers 39 each comprises a pair of separate truncated cones 41 and 42 which are oppositely disposed in end-to-end relation, having their smaller diameter ends 43 and 44 in confronting relationship. The included angle C between the converging conical surfaces 45 and 46 of the truncated cones 41 and 42 is about 90 degrees. The truncated cones 41 and 42 are mounted for independent rotation on a common axle 47 which is angularly disposed to the horizontal pathway of the moving belt 14 at an included angle D of about 45 degrees. The common axles 47 of the third pair of folding rollers 39 are resiliently and horizontally preloaded in directions towards each other and the moving belt 14 by any appropriate means, such as hydraulic cylinders or coil springs 36, as previously mentioned.

The belt 14 and completely folded gumstrips 11 travel downstream from the third folding stage S3 to a final station or fourth stage S4 where a pair of vertically spaced, cylindrical stitching rollers 50 and 51 are provided adjacent each of the pair of opposing marginal edges 12 and 13 of the moving belt 14 to stitch down and firmly compress the gumstrips 11 against the moving belt 14 in encapsulating relation with the marginal belt edges 12 and 13. The stitching rollers 50 and 51 rotate about their center axes 52 and 53 which are parallel to the horizontal pathway of the moving belt 14, and can be preloaded in directions towards each other, if desired, by similar means 36, as previously described.

It has been found that using horizontally preloaded rollers at a number of stations to incrementally fold the gumstrips 11 around the marginal edges of the moving belt 14 has proven to be a highly improved method or process of encapsulating the marginal edges of the moving belt in unvulcanized gum rubber, after which the belt is removed for further processing or building of a tire. The use of vertically biased or spring loaded rollers have been used in the past to fold fabric like material around V-belts during several stages of the folding process which takes place in at least a semi-circular pathway.

With particular reference to FIGS. 8–9 which are similar to FIGS. 3 and 4 as to illustration purposes, there is shown a second embodiment of the invention wherein the gumstrips 11 are initially positioned vertically against the marginal edges 12 and 13 of the horizontally moving belt 14 by vertically oriented, cylindrical applicator rollers 54 which are resiliently preloaded in horizontal directions towards the marginal belt edges 12 and 13 by any suitable means 36, such as previously described. A first set of generally spool-shaped rollers 56 are used at the first station or stage S1 of the folding operation to engage and fold the opposing, overhanging gumstrip ends 57 and 58 to similar positions where the ends 57 and 58 are angularly disposed to the horizontally moving belt 14 at the same acute angles E which are substantially less than 90 degrees, e.g. 45 degrees. In this second embodiment, the center and rotational axes of the first stage rollers 56, are vertically disposed or normal to the horizontal pathway of the moving belt 14. The first stage rollers 56 are preloaded horizontally in directions towards each other and the marginal belt edges 12 and 13, by any suitable means 36, as previously described. It should be apparent to those skilled in the art, that similar folding rollers can be used at succeeding stations to complete the folding of the gumstrips 11, after which the gumstrips 11 are stitched down, all as previously described.

With reference to FIG. 10, there is shown a typical prior art roller 60 which, unlike the above described folding rollers 32,37,39 and 56, is fixedly mounted adjacent each of the marginal edges 12,13, of the moving belt 14 to, for example, reversely fold any overhanging portions 24 around an adjacent marginal edge 12,13, at a single station or at a plurality of stations. In either case, the prior art rollers 60 are fixed and not laterally preloaded or resiliently adjustable to accommodate variations in the width of a belt, as previously described. The prior art roller 60 comprises an upper conical portion 61 which is concentrically disposed in juxtaposed relation with a lower conical portion 62 which has a tapered surface 63 that is disposed at an angle F of about 15 degrees measured from a plane P which is normal to the center or rotational axis X—X of the roller 60, the center axis X—X being at an angle G of about 15 degrees from the vertical V, when the belt 14 is traveling in a horizontal pathway.

The invention is mainly described above in relation to FIGS. 1–7 which show the placement of a pair of gumstrips 11 on the top sides 64 (FIG. 3) of the marginal edges 12 and 13 of a moving belt 14. It can be appreciated by those skilled in the art, that the technology of the invention can be readily adapted to, I) the placement of a gumstrip 11 on the top side 64 of only one of the opposing marginal edges 12 or 13 of a moving belt 14, or II) the placement of a gumstrip on the bottom or underside 65 of one or both of the opposing marginal edges 12, 13, of a moving belt 14, if such is desired.

Thus, there has been described a unique dual gumstrip applicator which employs, I) a precision device for guiding each gumstrip into contact with a horizontally moving tire reinforcement belt, II) a unique roller for applying each gumstrip to the moving belt, III) a novel combination of roller and angularly disposed plate for stripping a protective liner from each gumstrip after it has been applied to the moving belt, IV) several stages for folding each gumstrip in encapsulating relation around an adjacent marginal edge of the moving belt to insure that each gumstrip makes good sealing contact with a marginal edge of the belt, and V) resiliently and horizontally preloading the rollers which incrementally fold each gumstrip at the various stages to adjust or compensate for any variations in the width of the moving belt.

What is claimed is:

1. An apparatus for applying a strip of unvulcanized gum rubber, hereinafter referred to as a gumstrip, to at least one marginal edge of an unvulcanized tire reinforcement belt, as the belt moves in a horizontal pathway through the apparatus, comprising in combination:

a) at least one supply of a continuous tire reinforcement belt which is movable in a horizontal pathway through the apparatus;

b) first means, including at least one reel of gumstrip, disposed in spaced relation from the horizontal pathway of the moving belt, for paying out the gumstrip from the reel in a direction towards an adjacent marginal edge of the belt, as the belt begins to move through the apparatus, the first means including a device for braking the paying out of the gumstrip to tension the gumstrip as it moves towards the horizontal pathway of the moving belt, the gumstrip having a pair of opposing sides which are tacky, one of the sides being exposed and the other of the sides being covered by a removable liner;

c) second means downstream of the gumstrip paying out first means, relative to the movement of the gumstrip towards the belt moving in the horizontal pathway, for positioning the gumstrip for contact with the belt, prior to contact of the exposed side of the gumstrip with the adjacent marginal edge of the moving belt, the second means including at least one barrel-shaped roller;

d) third means for guiding the gumstrip, in tension, at least partially around the at least one barrel-shaped roller, such that the gumstrip compressively engages the roller to effect the positioning of the gumstrip for contact on the belt;

e) an applicator roller adjacent the horizontal pathway of the moving belt, for receiving the gumstrip from the at least one barrel-shaped roller and directing the exposed side of the gumstrip into compressive engagement with the adjacent marginal edge of the moving belt, the applicator roller having a pair of opposing ends, midway between which ends is a smooth cylindrical surface which is the only surface of the applicator roller to engage the gumstrip;

f) fifth means for removing the liner from the gumstrip at an obtuse angle of about 120 degrees, measured from the horizontal pathway of the moving belt immediately downstream from the fifth means, after the gumstrip is engaged with the moving belt, the fifth means including i) a flat plate which is angularly disposed to the horizontal pathway of the moving belt at a similarly measured obtuse angle which is at least 120 degrees, the plate having a straight edge which extends transversely across the gumstrip and engages the liner as it leaves the gumstrip, and ii) a stripping roller associated with the flat plate and disposed in farther spaced relation from the horizontal pathway of the moving belt than the associated flat plate which is in farther spaced relation from the applicator roller, measured horizontally, than the stripping roller; and g) sixth means for supporting the belt and attached gumstrip, as they move through the apparatus along the horizontal pathway.

2. An apparatus for applying a strip of unvulcanized gum rubber, hereinafter referred to as a gumstrip, to at least one marginal edge of an unvulcanized tire reinforcement belt, as the belt moves in a horizontal pathway through the apparatus, comprising:

a) first means disposed in spaced relation from the horizontal pathway of the moving belt, for paying out a gumstrip, in tension, in a direction towards an adjacent marginal edge of the belt, as the belt begins to move through the apparatus, the gumstrip having a pair of opposing sides which are tacky, one of the sides being exposed and the other of the sides being covered by a removable liner;

b) second means downstream of the gumstrip paying out means, relative to the movement of the gumstrip towards the belt moving in the horizontal pathway, for positioning the gumstrip for contact with the belt, prior to contact of the exposed side of the gumstrip with the adjacent marginal edge of the moving belt, the second means including at least one barrel-shaped roller which is designed to position the gumstrip for contact with the moving belt, such that a portion of the gumstrip extends laterally beyond and overhangs the adjacent marginal edge of the belt;

c) third means for guiding the gumstrip, in tension, at least partially around the at least one barrel-shaped roller;

d) fourth means adjacent the horizontal pathway of the moving belt, for receiving the gumstrip from the at least one barrel-shaped roller and directing the exposed side of the gumstrip into compressive engagement with the adjacent marginal edge of the moving belt, the fourth means including an applicator roller for applying the gumstrip to the moving belt, the applicator roller having a pair of opposing ends, midway between which ends is a smooth cylindrical surface which is the only surface of the applicator roller to engage the gumstrip;

e) fifth means for removing the liner from the gumstrip, after the gumstrip is engaged with the moving belt, the fifth means including means for removing the liner from each gumstrip at an obtuse angle of about 120 degrees, measured from the horizontally moving belt immediately downstream from the point of removal of the liner from the gumstrip, the means for removing the liner from the gumstrip including; i) a flat plate disposed to the horizontally moving belt at a similarly measured obtuse angle which is at least 120 degrees, the plate having a straight edge which extends transversely across the gumstrip for engaging the liner as it leaves the gumstrip, and ii) a stripping roller associated with the flat plate and disposed in farther spaced relation from the horizontal pathway of the moving belt than the associated flat plate which is in farther spaced relation from the applicator roller, measured horizontally, than the stripping roller;

f) sixth means for supporting the belt and attached gumstrip, as they move through the apparatus; and ff) a plurality of stations where the overhanging portion of the gumstrip is reversely folded around the adjacent marginal edge of the belt to encapsulate the marginal edge in unvulcanized gum rubber, the plurality of stations including a last station from which the belt and attached gumstrip exit the apparatus.

3. The apparatus of claim 2, which includes a first station disposed downstream from the fourth means and through which the belt passes, the first station including:

g) at least one gumstrip folding roller positioned to engage the overhanging portion of the gumstrip and at least partially fold the overhanging portion to a second position where it compressively engages and seals the adjacent marginal edge of the moving belt from the ambient atmosphere; and h) means for resiliently preloading the at least one gumstrip folding roller in a horizontal direction towards the adjacent marginal edge of the moving belt.

4. The apparatus of claim 3, wherein the gumstrip folding roller at the first station, includes:

I) a first roller designed to engage and hold down each gumstrip against the adjacent marginal edge of the moving belt;

II) a second roller coaxially aligned with the first roller and separate therefrom, the second roller designed to engage and at least partially fold the overhanging portion of each gumstrip;

III) means mounting the first and second rollers of each pair of such rollers on a common axle for independent rotation, the common axle being normal to the horizontal pathway of the moving belt; and wherein the means for resiliently preloading the at least one gumstrip folding roller at the first station includes means for resiliently preloading the common axle of the first and second rollers of each pair of such rollers.

5. The apparatus of claim 4, wherein each pair of first and second rollers at the first station are generally mushroom-shaped and include a larger diameter, cylindrical first roller and a smaller diameter, cylindrical second roller.

6. The apparatus of claim 3, which includes a second station downstream from the first station and through which the belt and partially folded gumstrip move, the second station including;

j) at least one gumstrip folding roller positioned to engage the partially folded overhanging portion of the gumstrip, to further fold the partially folded portion to a third position where the included angle between the moving belt and folded gumstrip portion in the third position is substantially less than 90 degrees; and k) means for resiliently preloading the at least one gumstrip folding roller at the second station in a horizontal direction towards the adjacent marginal edge of the moving belt.

7. The apparatus of claim 6, wherein the at least one gumstrip folding roller at the second station, includes:

IV) a third roller designed to engage and hold down the gumstrip against the adjacent marginal edge of the moving belt;

V) a fourth roller coaxially aligned with the third roller and separate therefrom, the fourth roller designed to engage and fold the partially folded overhanging portion from the second position to the third position;

VI) means mounting the third and fourth rollers of each pair of such rollers for independent rotation on a common axle which is normal to the horizontal pathway of the moving belt; and wherein the means for resiliently preloading the at least one gumstrip folding roller at the second station includes means for resiliently preloading the common axle of the third and fourth rollers of each pair of such rollers at the second station.

8. The apparatus of claim 7, wherein each pair of third and fourth rollers at the second station are generally mushroom-shaped and where the fourth roller is a truncated cone which has a smaller diameter base that is adjacent the third roller which is cylindrical and has a diameter which is substantially larger than the smaller diameter base of the fourth roller.

9. The apparatus of claim 6, which includes a last station downstream from the second station and through which the belt and attached gumstrip finally move, the last station including:

m) a pair of cylindrical stitching rollers positioned to sandwich between them, the adjacent marginal edge of the moving belt and gumstrip thereat, the pair of stitching rollers designed to compress the gumstrips encapsulating relation around the marginal edges of the belt.

10. The apparatus of claim 9, which includes means for resiliently preloading the rollers of the pair of stitching rollers in directions towards each other and the marginal edges of the belt.

11. The apparatus of claims 4, 7, or 9, which includes a third station which is located between the second and last stations, the third station including:

n) at least one gumstrip folding roller which is designed to engage the adjacent overhanging gumstrip portion in the third position and fold said overhanging gumstrip portion to a fourth position where said portion is ready for stitching; and o) means for resiliently preloading the at least one gumstrip folding roller at the third station in a horizontal direction towards an adjacent marginal of the moving belt.

12. The apparatus of claim 11, wherein the at least one gumstrip folding roller at the third station, includes:

VII) a truncated conical fifth roller and a separate, truncated conical sixth roller disposed in end-to-end relation, such that the conical surfaces of the fifth and sixth rollers converge in directions towards each other, the included angle between the converging conical surfaces being about 90 degrees;

VIII) means mounting the fifth and sixth truncated conical rollers in end-to-end relation, on a common axle for independent rotation, the common axle being angularly disposed to the horizontal pathway of the moving belt, such that the included angle between the common axle and moving belt is about 45 degrees; and wherein the means for resiliently preloading the at least one gumstrip folding roller at the third station, includes means for horizontally and resiliently preloading the common axle of the fifth and sixth truncated conical rollers.

13. An apparatus for applying strips of unvulcanized gum rubber, hereinafter referred to as gumstrips, to the marginal edges of an unvulcanized tire reinforcement belt, as the belt moves in a horizontal pathway through the apparatus, comprising:

a) first means for supporting a belt in a horizontal pathway, as it moves through the apparatus;

b) second means disposed above the horizontal belt pathway, for paying out a pair of gumstrips in directions towards the marginal edges of a belt moving along the pathway, each of the gumstrips having a pair of opposing sides, one of which sides is exposed and the other of which sides is covered with a protective liner;

c) third means for tensioning the gumstrips as they pay out from the second means;

d) fourth means disposed between the second means and horizontal belt pathway, for guiding the gumstrips into positions for predetermined overlapping relation on the marginal edges of a belt moving in the horizontal pathway, prior to contact of the exposed sides of the gumstrips with the marginal edges of the moving belt, the fourth means including, I) at least one pair of barrel-shaped rollers for engaging the gumstrips as they pay out from the second means, II) means for adjusting the lateral positions of the barrel-shaped rollers in directions toward and away from each other, and III) means for causing the gumstrips, moving in tension, to move at least partially around the barrel-shaped rollers in contact therewith, whereby the gumstrips compressively engage the barrel-shaped rollers;

e) fifth means adjacent the horizontal belt pathway, for directing the exposed sides of the laterally positioned gumstrips from the barrel-shaped rollers into contact with the marginal edges of the moving belt, the fifth means including at least one pair of applicator rollers, each of which has a cylindrical center section which is disposed between opposing ends of the applicator roller for pressing the gumstrips against the marginal edges of the moving belt; and f) sixth means disposed downstream of the fifth means, relative to movement of a belt through the apparatus, for removing the liner from the gumstrips at an obtuse angle of about 120 degrees, measured from the belt moving horizontally immediately downstream of the sixth means which includes, IV) a flat plate with a straight edge engaging each liner as it leaves the gumstrip to which it is attached, each flat plate being disposed at an obtuse angle, measured as previously specified, which is greater than 120 degrees, and V) means for directing each liner from a straight edge at the obtuse angle of 120 degrees.

14. The apparatus of claim 13, which includes:

g) a first station disposed downstream from the flat plates, the first station including, VI) at least one pair of gumstrip folding rollers which are laterally aligned and spaced adjacent the marginal edges of a belt moving through the first station, the rollers being designed to engage and initially fold any portion of a gumstrip which overhangs the marginal edges of a belt moving between them, and VII) means for resiliently preloading the gumstrip folding rollers horizontally in directions towards each other and a belt with attached gumstrips moving between them;

h) a second station disposed downstream from the first station, the second station including, VIII) at least one pair of laterally aligned and spaced gumstrip folding rollers adjacent the marginal edges of a belt moving through the second station, the gumstrip folding rollers at the second station being designed to engage and further fold any portion of a gumstrip which has been initially folded at the first station, and IX) means for resiliently preloading the gumstrip folding rollers at the second station horizontally in directions towards each other and a belt with attached gumstrips moving between them; and j) a last station disposed downstream from the second station, the last station including, X) at least one pair of stitching rollers positioned to sandwich between them, each marginal edge of a belt with attached folded gumstrip, each pair of stitching rollers being designed to compress the folded gumstrips against the belt in encapsulation relation around the marginal edges of the belt.

15. The apparatus of claim 14, which includes a third station disposed between the second and last stations, the third station including, XI) at least one pair of gumstrip folding rollers in laterally aligned and spaced relation adjacent the marginal edges of a belt moving through the third station, the gumstrip folding rollers of the third station being designed to complete the folding of portions of the gumstrips overhanging the marginal edges of the belt, and XII) means for resiliently and horizontally preloading the gumstrip folding rollers of the third station in directions towards each other and the moving belt.

16. The apparatus of claim 15, wherein:

each pair of gumstrip folding rollers at the first station, includes; an upper cylindrical roller in juxtaposed relation over a separate, lower cylindrical roller which has a smaller diameter than the upper roller and which is designed for folding engagement with an overhanging portion of a gumstrip, and means mounting the upper and lower rollers on a common axle for independent rotation; and each pair of gumstrip folding rollers at the second station, includes; an upper cylindrical roller in juxtaposed relation over a separate, truncated conical lower roller which is designed for engagement with, and further folding of, an overhanging gumstrip portion which has been partially folded at the first station, and means mounting the upper and lower rollers of each pair of gumstrip folding rollers of the second station on a common axle for independent rotation, each pair of gumstrip folding rollers at the third station, includes: a truncated conical upper roller disposed in end-to-end relation above a separate, truncated conical lower roller which is designed to complete folding of an overhanging portion folded at the second station, the upper and lower rollers of each pair of rollers at the third station having conical surfaces which converge in directions toward each other, and the included angle between the converging conical surfaces being about 90 degrees; and means mounting the upper and lower rollers of each pair of rollers at the third station on a common axle for independent rotation, each axle being angularly to a horizontal plane, such that the included angle between each axle and horizontal plane is about 45 degrees, and wherein the means for resiliently preloading the at least one pair of gumstrip folding rollers at the first, second, and third stations includes means for separately and horizontally resiliently preloading each of the common axles.

* * * * *